J. R. OSUNA.
ANIMAL TRAP.
APPLICATION FILED JULY 8, 1921.
1,409,884.
Patented Mar. 14, 1922.
Fig. 1.
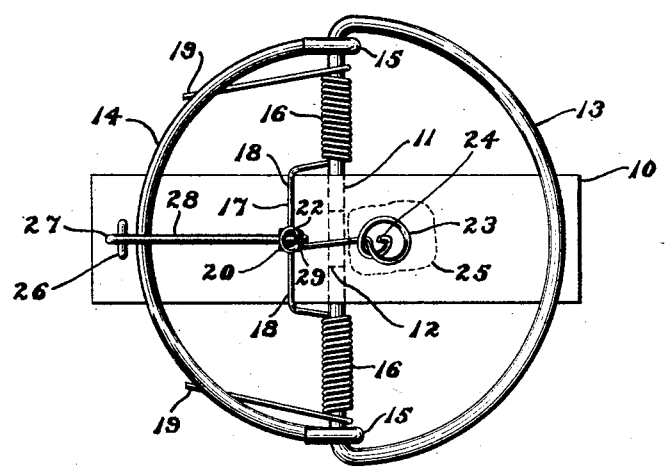
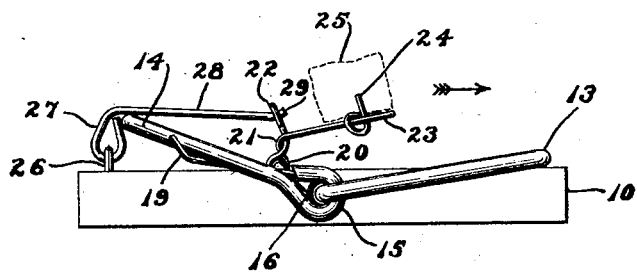
Fig. 2.
José R. Osuna.
INVENTOR

UNITED STATES PATENT OFFICE.

JOSÉ R. OSUNA, OF PHILADELPHIA, PENNSYLVANIA.

ANIMAL TRAP.

1,409,884.     Specification of Letters Patent.     Patented Mar. 14, 1922.

Application filed July 8, 1921. Serial No. 483,360.

*To all whom it may concern:*

Be it known that I, JOSÉ R. OSUNA, a subject of the King of Spain, residing at Philadelphia, in the county of Philadelphia and State of Pennsylvania, have invented new and useful Improvements in Animal Traps, of which the following is a specification.

This invention relates to animal traps and it has more particular reference to that type or form of trap which includes a pair of spring influenced members or jaws, one of which is adapted to be held open by means of a bait supporting trip device, the primary object being to provide a novel structure of animal trap which is exceptionally effective in use, whilst at the same time it is of a nature that readily lends itself for application and assembly under varying conditions.

Another object of this invention is to provide a trap which is simple in construction, cheap to manufacture, and not susceptible to derangement or inadvertant springing without effectively trapping the cause thereof.

With the foregoing objects in view my invention consists essentially in the novel features of construction, combination and arrangement of parts hereinafter fully described, and specifically defined by the appended claim.

In the further disclosure of the invention reference is to be had to the accompanying sheet of drawings constituting a part of this specification, and in which like characters of reference designate the same parts in both the views.

Figure 1 is a plan of one form of my invention; and

Figure 2 is a side view of the same.

Referring to the views the numeral 10 designates a base of appropriate material such as a rectangular block of wood or the like which is transversely bored at 11 to receive and journal the turned in ends 12 of a substantially semi-circular movable jaw 13 made from strong steel wire. The stationary jaw 14 is similarly made of steel wire and fashioned substantially semi-circular but of slightly less diameter, being formed at its ends with eye portions 15 arranged to pivot on the aforesaid turned in ends 12 of the movable jaw. The movable jaw 13 is spring influenced by means of coil spring portions 16 having an integral central bridge portion 17 straddling the aforesaid base 10 and prevented from longitudinal displacement by engaging in notches 18 provided for the purpose on its upper longitudinal edges, and said spaced springs 16 have their free ends outwardly and longitudinally directed to engage or hook at 19 on the outerside of the movable jaw 13.

Loosely coiled once or twice about the center of the aforesaid bridge portion 17 to provide a hinged ring 20 is a length of wire the ends whereof are twisted together at 21, the shorter of said ends being upwardly directed and finished of eyelet fashion at 22, whereas the longer of said ends is laterally extended and looped at 23 with the extreme end turned vertical and pointed at 24 to pierce the bait—shown by dotted lines—25, it being noted the looped portion 23 constitutes a seat or holder for said bait.

Securely attached in the base 10 is a staple 26 that serves as a pivot or hinge for the trap setting and movable jaw-holding member appropriately fashioned as shown with a pear-shaped eye-portion 27 engaging the staple 26 and an arm 28 terminating with a slightly curved end 29 adapted to be engaged by the aforesaid eyelet 22 of the bait holder.

From the foregoing description and an examination of the drawings the setting of the trap will be obvious without further explanation, but it is to be noted that the slightest pull in the direction of the arrow—Figure 2—by a cautious animal will instantly release the parts 22, 29 from engagement whereupon the movable jaw 14 will be thrown over with violent force under the action of the coil springs 16 and thereby effectively trap the animal. This feature I deem of considerable importance in that it is well known many animals and rodents are extremely cautious when approaching a baited trap. On the other hand a downwardly directed vertical pressure on the top of the bait 25 will similarly spring the trap and ensure the prompt trapping or killing of the animal or rodent.

Whilst I have shown and described one practical embodiment of my invention it will be clearly seen that the same is susceptible of considerable change and variation in the size and strength of the several parts to adapt the said invention for trapping different species of animals and rodents, and I hereby reserve the right to make such changes as fairly fall within the scope of the appended claim.

Having described my invention, what I claim as new and desire to secure by Letters Patent is:

An animal trap comprising a rectangular base, a semi-circular fixed jaw having inturned ends journaled in said base, a movable semi-circular jaw pivoted on the inturned portions of the fixed jaw, coil springs encircling the inturned ends of the stationary jaw, and having a central bridge portion seating on the aforesaid base, the free ends of the coil springs being hooked beneath the movable jaw, a bait holding means hinged on the aforesaid bridge portion and including an upstanding loop for engagement with a trap-setting member, and a laterally disposed loop portion terminating in an upstanding prong, said laterally disposed loop portion constituting the bait holder.

In testimony whereof I affix my signature.

JOSÉ R. OSUNA.